US Patent Office
3,281,432
Patented Oct. 25, 1966

3,281,432
OCTAHYDRO-1,3a,6-TRIMETHYL-1H-1,6a, ETHA-NOPENTALENO-(1,2-C)-FURAN AND PROCESS THEREFOR
Jack H. Blumenthal, Oakhurst, Gilbert Stork, Leonia, and Ernst T. Theimer, Rumson, N.J., assignors to International Flavors & Fragrances Inc., New York, N.Y., a corporation of New York
No Drawing. Filed June 25, 1965, Ser. No. 467,131
5 Claims. (Cl. 260—346.2)

This invention relates to sesquiterpene compounds. More specifically, it relates to a novel tetracyclic oxide which has a woody, amber odor useful in perfumery. This compound is octahydro-1,3a,6-trimethyl-1H-1, 6a-ethanopentaleno-(1,2-C) furan, and has the formula:

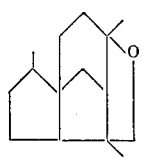

It is concerned also with methods for the preparation of this compound.

The principal object of this invention is to prepare this compound, and to do so by a simple and efficient process.

The invention comprises the novel product as well as the novel processes and steps of processes according to which such product is manufactured, and the specific embodiments of which are described hereinafter by way of example, and in accordance with which we now prefer to practice the invention.

In carrying out the invention we prepare a cedryl hypohalite by reacting cedrol with a hypohalous acid. For ease of operation, and because of their ready availability, we prefer to utilize either hypochlorous or hypobromous acid.

The hypohalites thus prepared are next converted to halohydrins, preferably by exposing them to the action of actinic light. Conversion may also be effected with heat, although with somewhat lesser yields. The halohydrins may then be treated with a base such as sodium hydroxide to produce the desired product.

Specifically, we react cedrol in a reaction-inert organic solvent with a slight excess of hypochlorous acid in the absence of light, at a low temperature. The preferred solvent is carbon tetrachloride, although other inert aliphatic and aromatic hydrocarbon and halogenated hydrocarbon solvents may be employed. Suitable solvents include perchloroethylene, heptane, cyclohexane, and 1,1,2-trichloro-trifluoroethane.

The hypochlorous acid is best generated in situ by the reaction of an acid with an alkali metal or alkaline earth metal hypochlorite salt. Aqueous sodium hypochlorite is commercially available and is preferred, although other hypochlorites such as potassium, calcium and barium can also be used. One convenient procedure is the acidification of commercial bleach (aqueous sodium hypochlorite) by reaction with an acid which may be either organic or inorganic, suitably acetic acid or mineral acids such as hydrochloric, sulfuric and hydrobromic acids.

The reaction for the preparation of cedryl hypohalite is carried out in the dark to avoid the formation of undesirable side products as much as possible, and is a low temperature reaction. The temperature range is from about −10° C. to about 30° C., and the preferred range is from 0° C. to 10° C. This latter range is preferred, since the hypohalites are somewhat heat sensitive.

The duration of reaction in the described range is from about 2 to about 3 hours. The course of the reaction can be conveniently followed by testing for active halogen by any known method. When the concentration of active halogen is constant the reaction may be terminated.

The solution containing the hypohalite may then be neutralized, although this step is not essential. The hypohalite is converted to the desired product in the original solvent, preferably by exposure to actinic light. In this procedure the solution of cedryl hypohalite is exposed to a source of either ultra-violet or visible light, preferably at a low temperature, until the reaction mixture is substantially free of active halogen.

The isomerization reaction is exothermic, and is preferably carried out below room temperature, although a temperature range of from about −10° C. to about 50° C. may be employed. A convenient range commensurate with good yields and ease of manipulation is from about 10° C. to about 25° C. The period of reaction in the above disclosed temperature range is generally from about 20 minutes to about two hours. Normally, the active halogen will substantially disappear in the periods mentioned, indicating that the reaction is substantially complete.

The reaction is carried out in an inert atmosphere, for example, in a nitrogen atmosphere, and may be conducted continuously.

At the end of the reaction period the organic solvent is removed, by distillation at atmospheric pressure or in vacuo, and the residue containing the halohydrin is treated with an excess base to convert it to the novel furan oxide derivative of this invention. The reaction is carried out in alcoholic base suitably methanolic or ethanolic sodium or potassium hydroxide, although other alcohols such as butanol or ethylene glycol may be employed. Conveniently, the reaction is carried out by adding the selected alcoholic base to the residue with stirring. The rate of reaction is fast and is apparently essentially complete in a short time. Completion of the reaction, however, may be assured by heating at the boiling point of the reaction mixture and this step may be suitably combined with the removal of the solvent by distillation at this boiling point. The temperature of the reacton, therefore, is not critical and may vary within a wide range, for example from about 25° C. to about 170° C. The reaction is a fast reaction and most of the time utilized in this reaction step will be devoted to the removal of the solvent. The time will, therefore, depend upon the quantities of reactants employed. For most reactions, a period of from about 1 to about 4 hours is suitable.

Alternatively, the halohydrin can be converted to the desired oxide simply by heating at from about 100° C. to about 120° C. in the absence of base for from about 2 to about 3 hours, or until there is no further evolution of hydrogen halide.

The furan is isolated from the reaction mixture after conversion, preferably by distillation.

In an alternative procedure for the isomerization of the hypohalite to a halohydrin, the reaction mixture containing the hypohalite is flash distilled. The flash distillation is accomplished by drop by drop addition of the reacton mixture to a hot still pot which is maintained above the boiling point of the solvent. The solvent flashes off, leaving the halohydrin in the still pot. It is then converted to the oxide as described above. Ordinary distillation should be avoided because of the danger that the hypohalite will decompose explosively if large quantities are heated to a high temperature.

The following are examples of the manner in which we now prefer to practice our invention. It is to be understood that the invention is not limited to the examples, except as indicated in the appended claims.

*Example I.—Octahydro-1,3a,6-trimethyl-1H-1,6a-ethanopentaleno-(1,2-C)-furan*

In a 12-liter, three-necked flask, equipped with stirrer, thermometer and addition funnel and wrapped in metal foil to exclude light, there are placed 9,000 g. of aqueous sodium hypochlorite solution (4.6% available chlorine). A solution of 1,040 g. (4.7 moles) of recrystallized cedrol, 24,000 cc. of carbon tetrachloride and 700 g. of glacial acetic acid is added at 0° C. over a period of 15 minutes. The reaction mixture is stirred at 0° C. for two hours. The carbon tetrachloride solution is separated, washed two times with cold sodium bicarbonate solution and dried over magnesium sulfate.

*Caution.*—The hypochlorite solution should be kept cold and protected from light as it is very labile and may decompose violently if allowed to stand in sunlight.

The carbon tetrachloride solution of cedryl hypochlorite prepared as described above is placed in a 5 liter, three-necked flask previously purged with nitrogen. A slow stream of nitrogen is continually passed through the flask during the reaction. With good stirring, the solution is cooled to about 5° C., using a Dry-Ice bath, and the light source, a 150-watt incandescent bulb placed about 1″ from the flask, turned on. The temperature of the reaction mixture is maintained between 10° C. and 19° C. by external cooling. After 45 minutes the test for active chlorine is negative. The carbon tetrachloride is removed by distillation and the residue refluxed with methanolic sodium hydroxide for three hours. Water is added and the methanol distilled off. The residual oil layer is separated and washed neutral with salt solution. The crude oil weighs 974 g. and contains 40% of the desired product. The pure oxide as entitled above is obtained by fractionation, B.P. 122/4.5 mm., $n_D^{20}$ 1.4984, $D_{25}^{25}$ 1.0059. The main feature of the IR spectrum is a strong absorption at 9.55 microns, typical of the tetrahydrofuran structure.

Salient features of the NMR spectrum of this compound are tabulated below:

| Proton | Chemical Shift |
|---|---|
| H–C–H with –O | 3.40 p.p.m. |
| $CH_3$–C–O– | 1.09 (s) |
| $CH_3$–C– | 0.98 (s) |
| $CH_3$–C–H | 0.82 (d) |

The spectrum is measured on the Varian A–60 Spectrometer. Chemical shift values are reported in p.p.m.; tetramethyl silane (internal standard) taken as O.

*Example II.—Octahydro-1,3a,6-trimethyl-1H-1,6a-ethanopentaleno-(1,2-C)-furan*

A solution containing cedryl hypochlorite in carbon tetrachloride is prepared as in Example I. The solution is flash distilled by dropwise addition to a still pot maintained at 110° C. During distillation the hypochlorite is converted to the crude chlorohydrin. This mixture is heated at 110° C. for two and one-half hours to produce the desired product above entitled. The product is isolated by fractional distillation, as described in Example I.

*Example III.—Octahydro-1,3a,6-trimethyl-1H-1,6a-ethanopentaleno-(1,2-C)-furan*

In a 1-liter, foil-wrapped flask is placed 250 ml. of heptane, 35 g. of cedrol (recrystallized) and 35 g. of mercuric oxide. The mixture is cooled to 10° C. and 6 ml. of bromine is added with good stirring at 10–12° C. over a period of 5 minutes. The mixture is stirred for 3 hours at 10° C. and then filtered. The filtrate is photoisomerized and worked up as in Example I. The crude product weighed 27 g. and contained 31% of the desired product.

*Example IV.—Octahydro-1,3a,6-trimethyl-1H-1,6a-ethanopentaleno-(1,2-C)-furan*

In a 5-liter flask is placed 2.6 liters of cyclohexane, 150 g. of lead tetracetate and 60 g. of calcium carbonate and the mass refluxed for 10 minutes. After cooling, 40 g. of recrystallized cedrol and 40 g. of iodine are added and the reaction mixture refluxed 6 hours under a nitrogen atmosphere with a 150-watt light bulb placed close to the flask. After cooling and filtering, the lead salts are washed with 150 ml. of cyclohexane and the combined filtrates washed with 10% sodium thiosulfate, then twice with water and the solvent stripped off under vacuum. The residue weighed 43 g. and contained 29% of the desired product.

We claim:
1. Octahydro - 1,3a,6 - trimethyl - 1H-1,6a, ethanopentaleno-(1,2-C)-furan.

2. A process for the preparation of octahydro-1,3a,6-trimethyl-1H-1,6a, ethanopentaleno-(1,2-C)-furan which comprises reacting cedrol with a reagent selected from the group consisting of hypochlorous and hypobromous acid to produce the corresponding hypohalite, exposing said hypohalite to the action of actinic light in an inert atmosphere to produce the corresponding halohydrin, and reacting said halohydrin with a base.

3. A process for the preparation of octahydro-1,3a,6-trimethyl-1H-1,6a, ethanopentaleno-(1,2-C)-furan which comprises reacting cedrol with a reagent selected from the group consisting of hypochlorous and hypobromous acid to produce the corresponding hypohalite, heating said hypohalite to produce the corresponding halohydrin, and reacting said halohydrin with a base.

4. A process for the preparation of octahydro-1,3a,6-trimethyl-1H-1,6a, ethanopentaleno-(1,2-C)-furan which comprises reacting cedrol with aqueous hypochlorous acid in the absence of light at a temperature of from about —10° C. to about 30° C. for a period from about two to about three hours, converting the thus produced hypochlorite to a chlorohydrin by exposure to actinic light at a temperature of from about —10° C. to about 50° C. in an inert atmosphere for a period of from about 20 minutes to about two hours, and reacting said chlorohydrin with alcoholic base.

5. A process for the preparation of octahydro-1,3a,6-trimethyl-1H-1,6a, ethanopentaleno-(1,2-C)-furan which comprises reacting cedrol with aqueous hypochlorous acid in the absence of light at a temperature from about —10° C. to about 30° C. for a period of from about two to about three hours, converting the thus produced hypochlorite to a chlorohydrin by exposure to actinic light in an inert atmosphere at a temperature of from about —10° C. to about 50° C. for a period from about 20 minutes to about two hours, and heating said chlorohydrin at a temperature of from about 100° C. to about 120° C. for from about two to about three hours.

No references cited.

ALEX MAZEL, *Primary Examiner.*

HENRY R. JILES, *Examiner.*

JAMES H. TURNIPSEED, *Assistant Examiner.*